(12) United States Patent
Chou et al.

(10) Patent No.: US 6,502,848 B1
(45) Date of Patent: Jan. 7, 2003

(54) TOW HITCH REAR BUMPER ASSEMBLY

(75) Inventors: Shui-Fang Chou, Troy, MI (US); Dhafer Mansoor, West Bloomfield, MI (US); Daniel Y. Hwang, Troy, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/698,711

(22) Filed: Oct. 27, 2000

Related U.S. Application Data

(63) Continuation of application No. 09/296,185, filed on Apr. 26, 1999, now Pat. No. 6,179,320.

(51) Int. Cl.$^7$ ................................................. B60D 1/14
(52) U.S. Cl. ................................... 280/500; 280/491.5
(58) Field of Search .............................. 280/495, 500, 280/501, 502, 505; 293/117

(56) References Cited

U.S. PATENT DOCUMENTS

| | | |
|---|---|---|
| 1,581,432 A | 4/1926 | Fageol |
| 1,935,447 A | 11/1933 | Hoffman |
| 2,604,349 A | 7/1952 | Martinetz |
| 2,753,193 A | 7/1956 | Halverson |
| 2,828,144 A | 3/1958 | Hosmer |
| 3,412,628 A | 11/1968 | De Gain |
| 3,495,474 A | 2/1970 | Nishimura et al. |
| 3,578,358 A | 5/1971 | Reynolds |
| 3,717,362 A * | 2/1973 | Johnson .................... 280/164.1 |
| 3,739,882 A | 6/1973 | Schwenk et al. |
| 3,819,224 A | 6/1974 | Casey et al. |
| 3,831,997 A | 8/1974 | Myers |
| 3,863,956 A * | 2/1975 | Khan ......................... 280/483 |
| 3,885,817 A | 5/1975 | Christian |
| 3,888,515 A | 6/1975 | Winter |
| 3,897,095 A | 7/1975 | Glance et al. |
| 3,905,630 A | 9/1975 | Cantrell |
| 3,912,295 A | 10/1975 | Eggert, Jr. |
| 3,930,670 A | 1/1976 | Haskins |
| 3,938,841 A | 2/1976 | Glance et al. |
| 3,964,768 A | 6/1976 | Reynolds |
| 3,997,207 A | 12/1976 | Norlin |
| 3,998,485 A | 12/1976 | Putter et al. |
| 4,023,652 A | 5/1977 | Torke |
| 4,190,276 A | 2/1980 | Hirano et al. |
| 4,272,114 A | 6/1981 | Hirano et al. |
| 4,465,312 A | 8/1984 | Werner |
| 4,468,052 A | 8/1984 | Koike |
| 4,634,163 A * | 1/1987 | Bundy et al. ................ 280/500 |
| 4,738,464 A * | 4/1988 | Putnam ....................... 280/500 |
| 4,829,979 A | 5/1989 | Moir |
| 4,830,686 A | 5/1989 | Hashiguchi et al. |
| 4,893,856 A | 1/1990 | Council |
| 4,901,486 A | 2/1990 | Kobori et al. |
| 5,080,411 A | 1/1992 | Stewart et al. |
| 5,116,092 A | 5/1992 | Schönleber |
| 5,154,492 A | 10/1992 | Carpenter |
| 5,201,912 A | 4/1993 | Terada et al. |
| 5,273,330 A | 12/1993 | Petry et al. |
| 5,314,229 A | 5/1994 | Matuzawa et al. |
| 5,387,002 A | 2/1995 | Grevich |
| 5,419,416 A | 5/1995 | Miyashita et al. |
| 5,431,445 A | 7/1995 | Wheatley |
| 5,688,006 A | 11/1997 | Bladow et al. |
| 5,722,708 A | 3/1998 | Jonsson |
| 5,727,804 A | 3/1998 | Metzger |
| 5,732,801 A | 3/1998 | Gertz |
| 5,785,367 A | 7/1998 | Baumann et al. |
| 5,803,514 A | 9/1998 | Shibuya et al. |
| 5,853,187 A | 12/1998 | Maier |
| 5,876,078 A | 3/1999 | Miskech et al. |
| 6,145,865 A * | 11/2000 | Cannara et al. .............. 280/507 |
| 6,149,181 A * | 11/2000 | Biederman ................ 280/491.1 |
| 6,189,910 B1 * | 2/2001 | Bartel ...................... 280/491.2 |

FOREIGN PATENT DOCUMENTS

| | | |
|---|---|---|
| DE | 2 137 517 | 2/1973 |
| GB | 2 307 665 | 11/1995 |

* cited by examiner

*Primary Examiner*—Kevin Hurley
(74) *Attorney, Agent, or Firm*—Gregory P. Brown

(57) ABSTRACT

A tow hitch rear bumper assembly for a motor vehicle includes a rear bumper for attachment to a frame of the motor vehicle and a tow hitch integrated with the rear bumper.

19 Claims, 2 Drawing Sheets

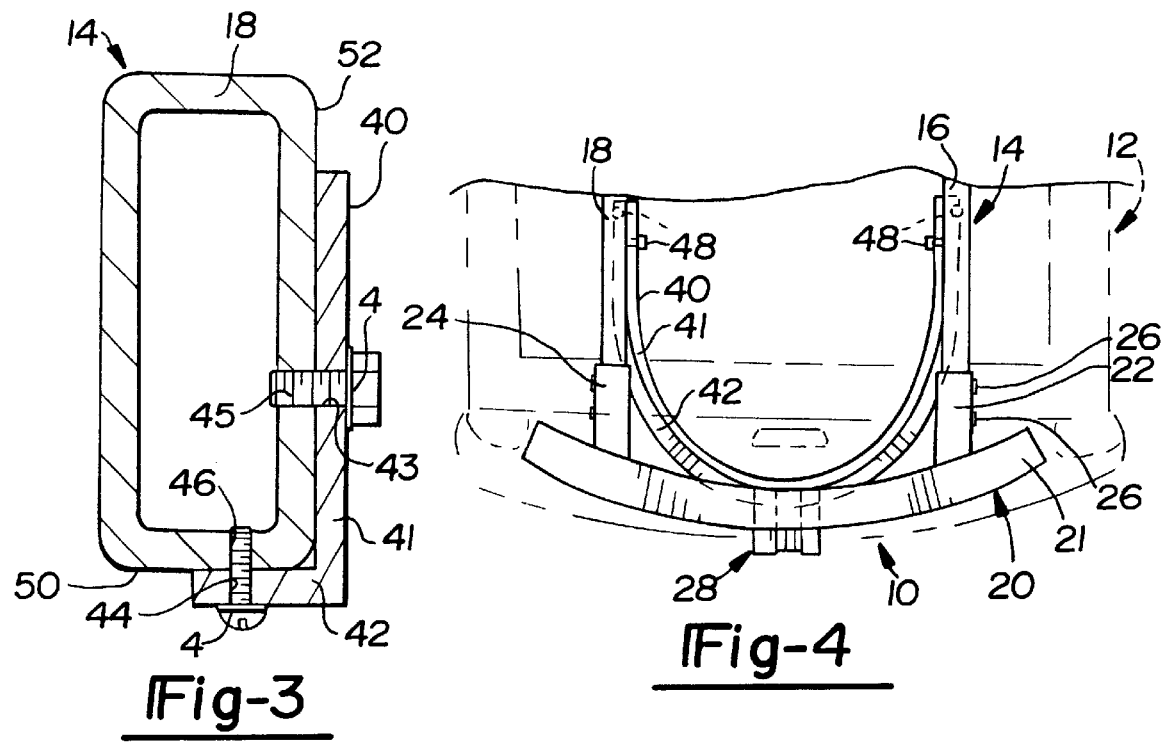
Fig-3
Fig-4
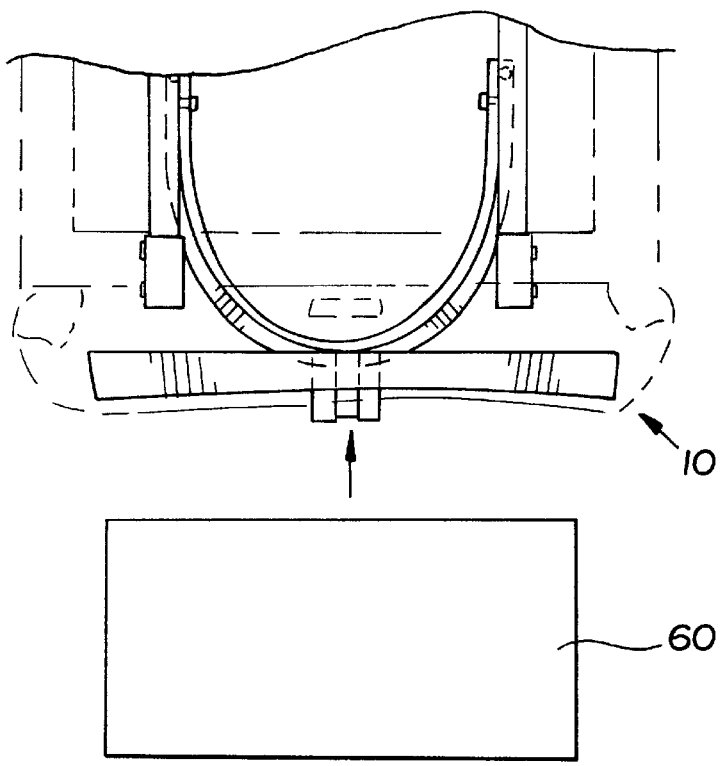
Fig-5

US 6,502,848 B1

TOW HITCH REAR BUMPER ASSEMBLY

The present application is a continuation of Ser. No. 09/296,185, filed Apr. 26, 1999 now U.S. Pat. No. 6,179,320.

BACKGROUND OF THE INVENTION

1. Field of the Invention

The present invention relates generally to rear bumpers for motor vehicles and, more specifically, to a tow hitch rear bumper assembly for a motor vehicle.

2. Description of the Related Art

It is known that a motor vehicle is equipped with a rear bumper assembly in order to protect its body in a low speed vehicle collision condition. It is also known that a separate tow hitch assembly may be equipped to a rear end of the motor vehicle in order to provide the motor vehicle with additional towing capacity. The rear bumper assembly typically includes a beam that extends transversely across the rear end of the motor vehicle. The tow hitch assembly typically includes a tow hitch receiver which is welded to a transverse tubular cross member and the tubular cross member is mounted to a frame of the motor vehicle through a pair of mounting brackets.

Although the above separate rear bumper and tow hitch assemblies have worked well, it is desirable to integrate these two assemblies into a single assembly in order to share their rigidity for both functions. It is also desirable to have an assembly, which will be lightweight and more durable while still meeting the motor vehicle towing requirement. It is further desirable to provide an integrated assembly that will enhance the rear bumper protection function in a low speed vehicle collision condition. Therefore, there is a need in the art to provide an integrated tow hitch and rear bumper assembly for a motor vehicle.

SUMMARY OF THE INVENTION

Accordingly, the present invention is a tow hitch rear bumper assembly for a motor vehicle. The tow hitch rear bumper assembly includes a rear bumper for attachment to a frame of the motor vehicle. The tow hitch rear bumper assembly also includes a tow hitch disposed below the rear bumper and connected thereto. The tow hitch rear bumper assembly further includes an arch shaped reinforcement connected to the tow hitch for attachment to the frame of the motor vehicle.

One advantage of the present invention is that a tow hitch rear bumper assembly is provided for a motor vehicle. Another advantage of the present invention is that the tow hitch rear bumper assembly integrates a tow hitch and rear bumper for a motor vehicle. Yet another advantage of the present invention is that the tow hitch rear bumper assembly has an arch shaped support for the tow hitch. Still another advantage of the present invention is that the tow hitch rear bumper assembly reduces possible damage to the motor vehicle in a low speed vehicle collision condition. A further advantage of the present invention is that the tow hitch rear bumper assembly is lightweight and meets motor vehicle towing requirements.

Other features and advantages of the present invention will be readily appreciated as the same becomes better understood after reading the subsequent description taken in conjunction with the accompanying drawings.

BRIEF DESCRIPTION OF THE DRAWINGS

FIG. 3 is a sectional view taken along line 3—3 of FIG. 2.

FIG. 4 is a plan view of the tow hitch rear bumper assembly and a portion of the motor vehicle of FIG. 1.

FIG. 5 is a view similar to FIG. 4 illustrating the tow hitch rear bumper assembly after a high speed vehicle collision condition.

DESCRIPTION OF THE PREFERRED EMBODIMENT(S)

Figure 1:
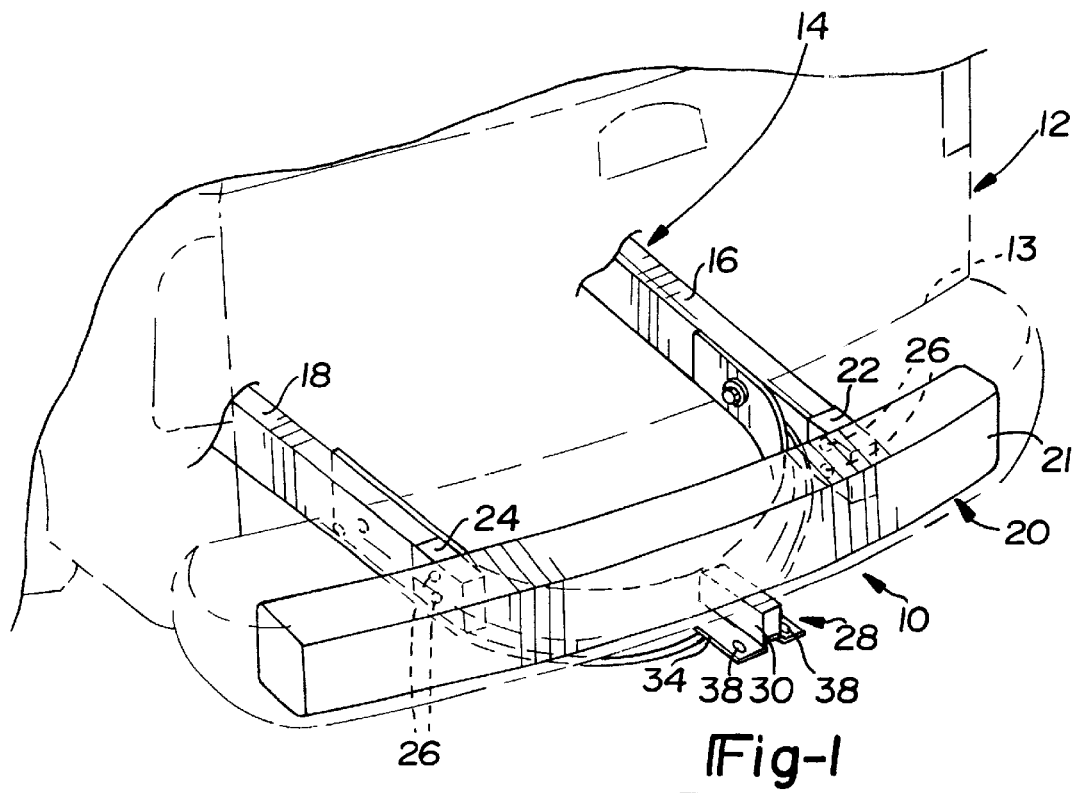
FIG. 1 is a perspective view of a tow hitch rear bumper assembly, according to the present invention, illustrated in operational relationship with a motor vehicle.
Figure 2:
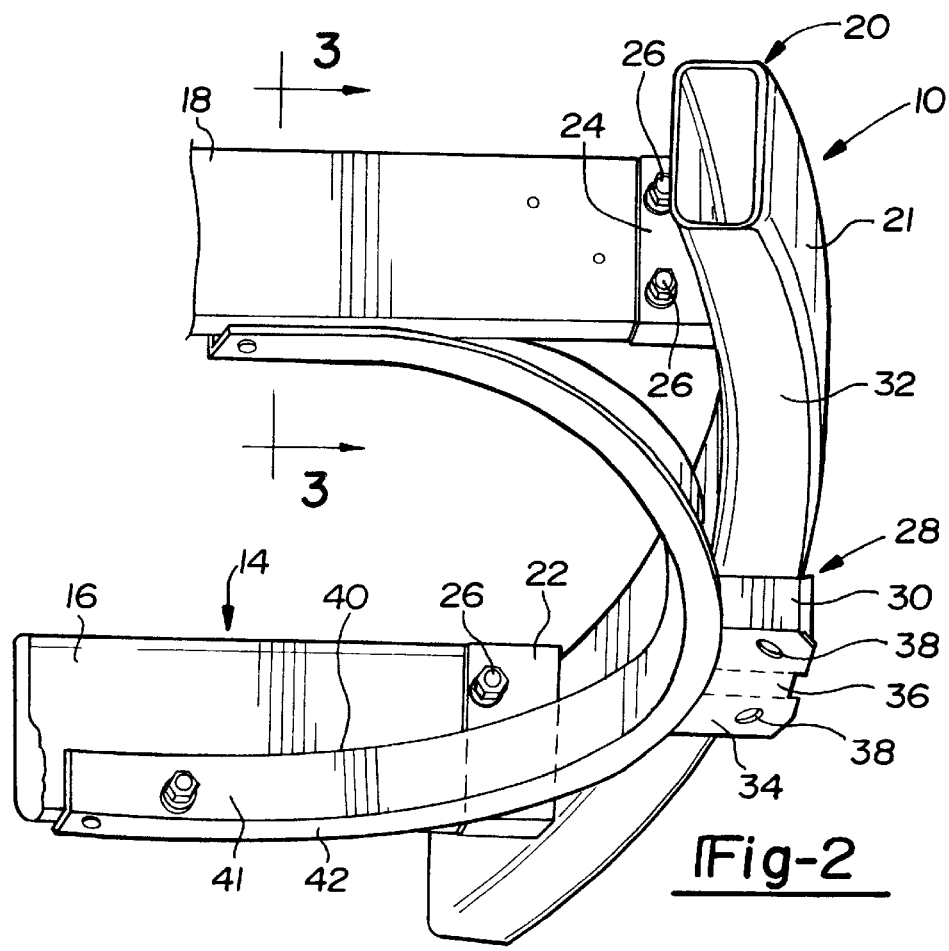
FIG. 2 is a perspective view of the tow hitch rear bumper assembly and a portion of the motor vehicle of FIG. 1.

Referring to the drawings and in particular FIGS. 1 and 2, one embodiment of a tow hitch rear bumper assembly 10, according to the present invention, is illustrated in operational relationship with a motor vehicle, generally indicated at 12, such as a pick-up truck. The tow hitch rear bumper assembly 10 is located at a rear end 13 of the motor vehicle 12 and allows for towing of another vehicle such as a trailer (not shown) behind the rear end 13 of the motor vehicle 12.

The motor vehicle 12 includes a frame, generally indicated at 14. The frame 14 includes a pair of side rails 16 and 18 extending longitudinally to the rear end 13 and spaced transversely. The side rails 16 and 18 are generally hollow with a rectangular cross-sectional shape. The side rails 16 and 18 are made of a metal material such as steel. It should be appreciated that the side rails 16 and 18 are conventional and known in the art. It should also be appreciated that, except for the tow hitch rear bumper assembly 10, the motor vehicle 12 is conventional and known in the art.

Referring to FIGS. 1 through 4, the tow hitch rear bumper assembly 10 includes a rear bumper, generally indicated at 20, at the rear end 13 of the motor vehicle 12. The rear bumper 20 includes a rear bumper beam 21 extending transversely. The rear bumper beam 21 is hollow and has a generally rectangular cross-sectional shape. The rear bumper beam 21 is also generally arcuate or curved transversely in shape. The rear bumper beam 21 is made of a metal material such as steel.

The rear bumper 20 also includes at least one, preferably a pair of bumper brackets 22 and 24 to attach the rear bumper beam 21 to the frame 14. The bumper brackets 22 and 24 are hollow with a generally rectangular cross-sectional shape. The bumper brackets 22 and 24 are made of a metal material such as steel. The bumper brackets 22 and 24 are spaced transversely along the rear bumper beam 21 and connected thereto by suitable means such as welding. The bumper bracket 22 is disposed over the side rail 16 and the bumper bracket 24 is disposed over the side rail 18 of the frame 14. The bumper brackets 22 and 24 are connected to the side rails 16 and 18, respectively, by suitable means such as fasteners 26. It should be appreciated that, in this embodiment, the fasteners 26 are bolts and nuts extending through the sides of the bumper brackets 22 and 24 and side rails 16 and 18.

The tow hitch rear bumper assembly 10 also includes a tow hitch, generally indicated at 28, disposed below the rear bumper 20. The tow hitch 28 includes a hitch receiver 30 for receiving a hitch (not shown). The hitch receiver 30 is a hollow tube having a generally rectangular cross-sectional shape. The hitch receiver 30 extends longitudinally and abuts a bottom face 32 of the rear bumper beam 21. The tow hitch 28 may also include a hitch plate 34 connected to the hitch receiver 30. The hitch plate 34 is a generally rectangular plate connected to a bottom face 36 of the hitch receiver 30 by suitable means such as welding. The hitch plate 34 includes at least one, preferably a pair of apertures 38 with one of the apertures 38 located on each side of the hitch receiver 30. It should be appreciated that the apertures 38 allow tow chains (not shown) to be attached thereto.

The tow hitch rear bumper assembly 10 further includes an arch shaped reinforcement 40 connected to the tow hitch 28 and the frame 14 of the motor vehicle 12. The arch is shaped reinforcement 40 has a generally vertical side wall 41 and horizontal bottom wall 42 forming an L shaped cross-section. The arch shaped reinforcement 40 extends transversely in a generally curved or arcuate shape. The arch shaped reinforcement 40 is made of a metal material such as steel. The arch shaped reinforcement 40 has its ends connected to an inboard side of the frame 14. Each end of the arch shaped reinforcement 40 has at least one, preferably a pair of apertures 43 and 44 which are offset and extend through the side wall 41 and bottom wall 42 respectively. The ends of the arch shaped reinforcement 40 are connected by suitable fasteners 48 extending through the apertures 43 and 44 and corresponding apertures 45 and 46 in the side rails 16 and 18. It should be appreciated that the bottom wall 42 is connected to a bottom face 50 of the side rails 16 and 18 and the side wall 41 is connected to an inboard face 52 of the side rails 16 and 18.

The arch shaped reinforcement 40 is vertically inclined to lower its elevation to the level of the hitch receiver 30 and diagonally arch braced against a center span of the rear bumper beam 21 behind the hitch receiver 30. The arch shaped reinforcement 40 has a center thereof connected to a back side of the hitch receiver 30 by suitable means such as welding or fastening with bolts. The arch shaped reinforcement 40 is also connected to the hitch plate 34 by suitable means such as welding.

In operation, one function of the arch shaped reinforcement 40 is to provide support for the hitch receiver 30. Another function of the arch shaped reinforcement 40 is to absorb low speed vehicle collision energy. In a low speed vehicle collision, the arch shaped reinforcement 40 will help the rear bumper 20 to rebound back to its original shape through the arch force to minimize repair cost as illustrated in FIG. 4. In a high speed vehicle collision by an object 60 as illustrated in FIG. 5, the arch shaped reinforcement 40 will first bend forward to prevent the premature bending of the side rails 16 and 18 and the rear bumper beam 21. This will allow the rear bumper 20 and frame 14 of the motor vehicle 12 to crush axially to maximize their energy absorption. Under towing conditions, the rear bumper beam 21 will act like a horizontal cross member to support the tow hitch 28. The arch shaped reinforcement 40 will also serve as the "tension rod" and diagonal bracing for eccentric loading in the towing condition.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A motor vehicle comprising:
    a frame;
    a rear bumper attached to said frame and positioned generally vertically even with said frame, said rear bumper being hollow and having a generally rectangular cross-sectional shape; and
    a tow hitch integrated with said rear bumper.

2. A motor vehicle as set forth in claim 1 wherein said rear bumper includes a rear bumper beam and at least one bumper bracket connected to said rear bumper beam and to said frame.

3. A motor vehicle comprising:
    a frame;
    a rear bumper attached to said frame and positioned generally vertically even with said frame;
    a tow hitch integrated with said rear bumper; and
    an arch shaped reinforcement connected to said tow hitch and to said frame.

4. A motor vehicle as set forth in claim 3 wherein said arch shaped reinforcement is made of a metal material.

5. A motor vehicle as set forth in claim 3 wherein said arch shaped reinforcement extends transversely in a generally arcuate shape.

6. A motor vehicle as set forth in claim 3 wherein said tow hitch includes a hitch receiver extending longitudinally.

7. A tow hitch rear bumper assembly for a motor vehicle comprising:
    a rear bumper for attachment to a frame of the motor vehicle;
    a tow hitch integrated With said rear bumper;
    an arch shaped reinforcement connected to said tow hitch for attachment to the frame of the motor vehicle; and
    wherein said arch shaped reinforcement has a plurality of offset apertures and includes fasteners extending through said apertures for connection to a bottom face and inboard face of the frame of the motor vehicle.

8. A motor vehicle comprising:
    a frame;
    a rear bumper attached to said frame and positioned generally vertically even with said frame;
    a tow hitch integrated with said rear bumper;
    wherein said rear bumper includes a rear bumper beam and at least one bumper bracket connected to said rear bumper beam and to said frame; and
    wherein said rear bumper beam extends transversely in a generally arcuate shape.

9. A tow hitch rear bumper assembly for a motor vehicle comprising:
    a rear bumper for attachment to a frame of the motor vehicle;
    a tow hitch integrated with said rear bumper;
    an arch shaped reinforcement connected to said tow hitch for attachment to the frame of the motor vehicle;
    wherein said tow hitch includes a hitch receiver extending longitudinally; and
    wherein said tow hitch includes a hitch plate connected to said hitch receiver and said arch shaped reinforcement.

10. A tow hitch rear bumper assembly for a motor vehicle comprising:
    a rear bumper for attachment to a frame of the motor vehicle;
    a tow hitch integrated with said rear bumper;
    an arch shaped reinforcement connected to said tow hitch for attachment to the frame of the motor vehicle;
    wherein said tow hitch includes a hitch receiver extending longitudinally; and
    means for connecting said hitch receiver to said arch shaped reinforcement.

11. A tow hitch rear bumper assembly for a motor vehicle comprising:

a rear bumper beam extending transversely for attachment to a frame of the motor vehicle, said rear bumper beam extends transversely in an arcuate shape and is hollow and has a generally rectangular cross-sectional shape; and a hitch receiver connected to said rear bumper beam.

12. A tow hitch rear bumper assembly as set forth in claim 11, including an arch shaped reinforcement connected to said hitch receiver for attachment to the frame of the motor vehicle.

13. A tow hitch rear bumper assembly as set forth in claim 12, wherein said arch shaped reinforcement is made of a metal material.

14. A tow hitch rear bumper assembly for a motor vehicle comprising:

a rear bumper beam extending transversely for attachment to a frame of the motor vehicle, said rear bumper beam extends transversely in an arcuate shape and is hollow;

a hitch receiver connected to said rear bumper beam;

an arch shaped reinforcement connected to said hitch receiver for attachment to the frame of the motor vehicle; and wherein said arch shaped reinforcement has a generally vertical side wall and a generally horizontal bottom wall.

15. A rear bumper system as set forth in claim 14 wherein said arch shaped reinforcement has offset apertures extending through said side wall and said bottom wall and a plurality of fasteners extending through said apertures for connection to a bottom face and inboard face of the frame of the motor vehicle.

16. A tow hitch rear bumper assembly for a motor vehicle comprising:

a rear bumper beam extending transversely for attachment to a frame of the motor vehicle, said rear bumper beam extends transversely in an arcuate shape and is hollow;

a hitch receiver connected to said rear bumper beam;

an arch shaped reinforcement connected to said hitch receiver for attachment to the frame of the motor vehicle; and wherein said arch shaped reinforcement has a generally L shaped cross-section.

17. A tow hitch rear bumper assembly for a motor vehicle comprising:

a rear bumper beam extending transversely for attachment to a frame of the motor vehicle, said rear bumper beam extends transversely in an arcuate shape and is hollow;

a hitch receiver connected to said rear bumper beam;

an arch shaped reinforcement connected to said hitch receiver for attachment to the frame of the motor vehicle; and a hitch plate interconnecting said hitch receiver and said arch shaped reinforcement.

18. A motor vehicle comprising:

a frame;

a rear bumper beam extending transversely and operatively attached to said frame;

a hitch receiver connected to said rear bumper beam;

an arch shaped reinforcement connected to said hitch receiver and to said frame; and wherein said arch shaped reinforcement is inclined from said frame to said hitch receiver.

19. A motor vehicle comprising:

a frame having a pair of side rails;

a rear bumper beam extending transversely and a plurality of bumper brackets connected to said rear bumper beam, said bumper brackets being hollow to receive a portion of said side rails and being attached to said side rails; and a hitch receiver connected to said rear bumper beam.

* * * * *